United States Patent
Raetzman et al.

(10) Patent No.: US 9,750,176 B2
(45) Date of Patent: Sep. 5, 2017

(54) CLOSING SYSTEM FOR AN AGRICULTURAL IMPLEMENT

(71) Applicant: CNH Industrial America LLC, New Holland, PA (US)

(72) Inventors: Ryan R. Raetzman, Lemont, IL (US); Brian John Anderson, Yorkville, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/454,551

(22) Filed: Aug. 7, 2014

(65) Prior Publication Data

US 2016/0037704 A1 Feb. 11, 2016

(51) Int. Cl.
*A01C 5/06* (2006.01)

(52) U.S. Cl.
CPC .................................. *A01C 5/068* (2013.01)

(58) Field of Classification Search
CPC .... A01C 5/00; A01C 5/02; A01C 5/04; A01C 5/045; A01C 5/06; A01C 5/062; A01C 5/064; A01C 5/066; A01C 5/068; A01C 5/08; A01B 49/04; A01B 61/046; A01B 63/008
See application file for complete search history.

(56) References Cited

U.S. PATENT DOCUMENTS

| | | | | |
|---|---|---|---|---|
| 2,357,760 A | * | 9/1944 | Peacock | A01C 5/06 111/152 |
| 2,685,243 A | * | 8/1954 | Cole | A01C 5/06 111/136 |
| 3,598,069 A | * | 8/1971 | Hatcher | A01C 5/06 111/134 |
| 4,092,936 A | | 6/1978 | Griffin et al. | |
| 4,425,857 A | * | 1/1984 | Lienemann | A01C 5/06 111/134 |
| 4,579,071 A | * | 4/1986 | Johnson | A01C 5/068 111/195 |
| 4,596,199 A | * | 6/1986 | Dietrich, Sr. | A01C 5/068 111/123 |
| 4,633,791 A | * | 1/1987 | Lindstrom | A01C 5/062 111/152 |

(Continued)

FOREIGN PATENT DOCUMENTS

| | | | | |
|---|---|---|---|---|
| FR | 2041925 | * | 2/1971 | ............... A01C 5/06 |
| WO | 2014066650 | | 5/2014 | |
| WO | 2014153157 | | 9/2014 | |

*Primary Examiner* — Alicia Torres
*Assistant Examiner* — Adam Behrens
(74) *Attorney, Agent, or Firm* — Rebecca Henkel; Rickard DeMille

(57) ABSTRACT

A row unit for an agricultural implement includes a closing disc configured to move soil into a trench. The closing disc is rotatably coupled to a first portion of a support structure via a first arm to facilitate vertical movement of the closing disc relative to the support structure. The row unit also includes a packer wheel positioned aft of the closing disc and configured to pack soil over the trench. The packer wheel is rotatably coupled to a second portion of the support structure via a second arm. The closing disc and the packer wheel are independently movable relative to one another.

19 Claims, 3 Drawing Sheets

(56) References Cited

U.S. PATENT DOCUMENTS

| | | | | |
|---|---|---|---|---|
| 5,025,736 A * | 6/1991 | Anderson | | A01C 5/06 111/124 |
| 5,323,862 A * | 6/1994 | Furlough | | A01B 61/046 172/264 |
| 5,802,995 A * | 9/1998 | Baugher | | A01C 7/205 111/140 |
| 6,314,897 B1 | 11/2001 | Hagny | | |
| 6,454,019 B1 * | 9/2002 | Prairie | | A01B 63/145 111/163 |
| 6,530,334 B2 | 3/2003 | Hagny | | |
| 6,834,598 B2 | 12/2004 | Juptner | | |
| 6,871,709 B2 * | 3/2005 | Knobloch | | A01B 49/027 172/145 |
| 7,240,626 B2 | 7/2007 | Wendte et al. | | |
| 7,308,859 B2 * | 12/2007 | Wendte | | A01C 5/064 111/164 |
| 7,581,503 B2 | 9/2009 | Martin et al. | | |
| 7,784,416 B2 | 8/2010 | Thompson et al. | | |
| 8,448,587 B2 * | 5/2013 | Kowalchuk | | A01C 7/105 111/200 |
| 8,522,889 B2 * | 9/2013 | Adams | | A01C 7/203 111/136 |
| 8,634,992 B2 | 1/2014 | Sauder et al. | | |
| 8,635,961 B2 | 1/2014 | Morellini | | |
| 8,838,346 B1 * | 9/2014 | Griffin | | A01C 7/203 111/164 |
| 8,863,857 B2 | 10/2014 | Bassett | | |
| 8,939,095 B2 * | 1/2015 | Freed | | A01B 49/027 111/164 |
| 9,148,989 B2 * | 10/2015 | Van Buskirk | | A01C 5/066 |
| 2005/0155536 A1 * | 7/2005 | Wendte | | A01C 5/068 111/200 |
| 2006/0090680 A1 * | 5/2006 | Wendte | | A01C 5/064 111/135 |
| 2007/0022926 A1 * | 2/2007 | Flikkema | | A01C 7/205 111/62 |
| 2008/0190628 A1 * | 8/2008 | Steinlage | | A01B 21/086 172/166 |
| 2009/0007828 A1 * | 1/2009 | Johnson | | A01C 7/082 111/79 |
| 2009/0056962 A1 * | 3/2009 | Martin | | A01C 5/066 172/551 |
| 2010/0307398 A1 * | 12/2010 | Naylor | | A01C 7/081 111/200 |
| 2011/0120357 A1 * | 5/2011 | Schilling | | A01C 7/205 111/163 |
| 2011/0155031 A1 * | 6/2011 | Arnett | | A01C 5/066 111/193 |
| 2011/0313572 A1 * | 12/2011 | Kowalchuk | | A01C 7/205 700/275 |
| 2011/0313575 A1 * | 12/2011 | Kowalchuk | | A01C 7/205 700/282 |
| 2012/0048160 A1 * | 3/2012 | Adams | | A01C 7/203 111/163 |
| 2012/0079973 A1 * | 4/2012 | Swanson | | A01C 5/064 111/163 |
| 2012/0255475 A1 | 10/2012 | Mariman et al. | | |
| 2013/0032363 A1 | 2/2013 | Curry et al. | | |
| 2013/0206431 A1 * | 8/2013 | Freed | | A01B 49/027 172/1 |
| 2013/0319698 A1 | 12/2013 | Adams et al. | | |
| 2013/0325267 A1 | 12/2013 | Adams et al. | | |
| 2014/0026748 A1 | 1/2014 | Stoller et al. | | |
| 2014/0124227 A1 | 5/2014 | Sauder et al. | | |
| 2014/0190382 A1 | 7/2014 | Anderson et al. | | |
| 2014/0214284 A1 | 7/2014 | Sauder et al. | | |
| 2014/0224513 A1 * | 8/2014 | Van Buskirk | | A01C 5/066 172/140 |

* cited by examiner

CLOSING SYSTEM FOR AN AGRICULTURAL IMPLEMENT

BACKGROUND

The present application relates generally to agricultural implements, and more particularly, to a closing system for a planter or a similar agricultural implement.

Generally, planting implements (e.g., planters) are towed behind a tractor or other work vehicle via a mounting bracket secured to a rigid frame the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by closing discs that move the soil back into the trench and/or a packer wheel that packs the soil on top of the deposited seeds. In typical planters, the closing discs and the packer wheel of each row unit are coupled to one another (e.g., by a biasing member extending between a packer wheel arm and the closing discs) such that both the closing discs and the packer wheel move together as the row unit traverses uneven surfaces in the field. Accordingly, disruptions in the soil may negatively affect the manner in which the closing discs direct soil into the trench and/or the manner in which the packer wheel packs the soil into the trench. As a result, seed coverage may be uneven, which may cause undesirable growing conditions for the seeds, thereby reducing overall yield.

SUMMARY OF THE INVENTION

In one embodiment, a row unit for an agricultural implement includes a closing disc configured to move soil into a trench. The closing disc is rotatably coupled to a first portion of a support structure via a first arm to facilitate vertical movement of the closing disc relative to the support structure. The row unit also includes a packer wheel positioned aft of the closing disc and configured to pack soil over the trench. The packer wheel is rotatably coupled to a second portion of the support structure via a second arm. The closing disc and the packer wheel are independently movable relative to one another.

In one embodiment, a row unit for an agricultural implement includes a support structure and a closing disc suspended from the support structure at least in part by a first biasing member. The closing disc is configured to be positioned aft of an opener disc and to move soil into a trench formed by the opener disc as the agricultural implement travels across a field. The row unit also includes a packer wheel suspended from the support structure at least in part by a second biasing member. The packer wheel is positioned aft of the pair of closing discs and is configured to pack soil over the trench as the agricultural implement travels across the field. The closing disc and the packer wheel are separately suspended from the support structure to enable the closing disc and the packer wheel to move independently from one another in a vertical direction relative to the support structure.

In one embodiment, a row unit for an agricultural implement includes a support structure configured to be coupled to a frame of the row unit. The row unit includes a closing assembly having a closing disc configured to move soil into a trench. The closing disc is coupled to a first location and to a second location of the support structure via two closing assembly attachment elements. The row unit also includes a packing assembly having a packer wheel configured to pack the soil over the trench. The packer wheel is coupled to a third location and to a fourth location of the support structure via two packing assembly attachment elements. The two closing assembly attachment elements and the two packing assembly attachment elements facilitate independent movement of the closing disc and the packer wheel relative to one another in a vertical direction relative to the support structure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments disclosed herein include a closing system for a row unit of an agricultural implement, such as a planter. The agricultural implement includes one or more row units extending across a width of the agricultural implement, and each of the one or more row units includes a frame configured to support the closing system. The closing system of each of the one or more row units has a closing assembly having one or more closing discs for moving soil into a trench to cover seeds deposited therein. The closing system also includes a packer assembly having a packer wheel for packing the soil on top of the deposited seeds. In the disclosed embodiments, the closing assembly and the packer assembly are separately attached to a support structure that is mounted on the frame of the row unit. Such a configuration enables the closing discs and the packer wheel to independently move with respect to one another as the agricultural implement travels across a field. For example, if the closing discs encounter an obstruction in the soil, the closing discs may move vertically without causing movement of the packer wheel. The disclosed embodiments may enable the closing discs and the packer wheel to maintain appropriate contact with the soil as the agricultural implement travels across the field. Thus, the disclosed embodiments may enable efficient and effective closing of the trench and/or packing of the soil over the deposited seeds, thereby improving growing conditions and increasing yield.

Figure 1:
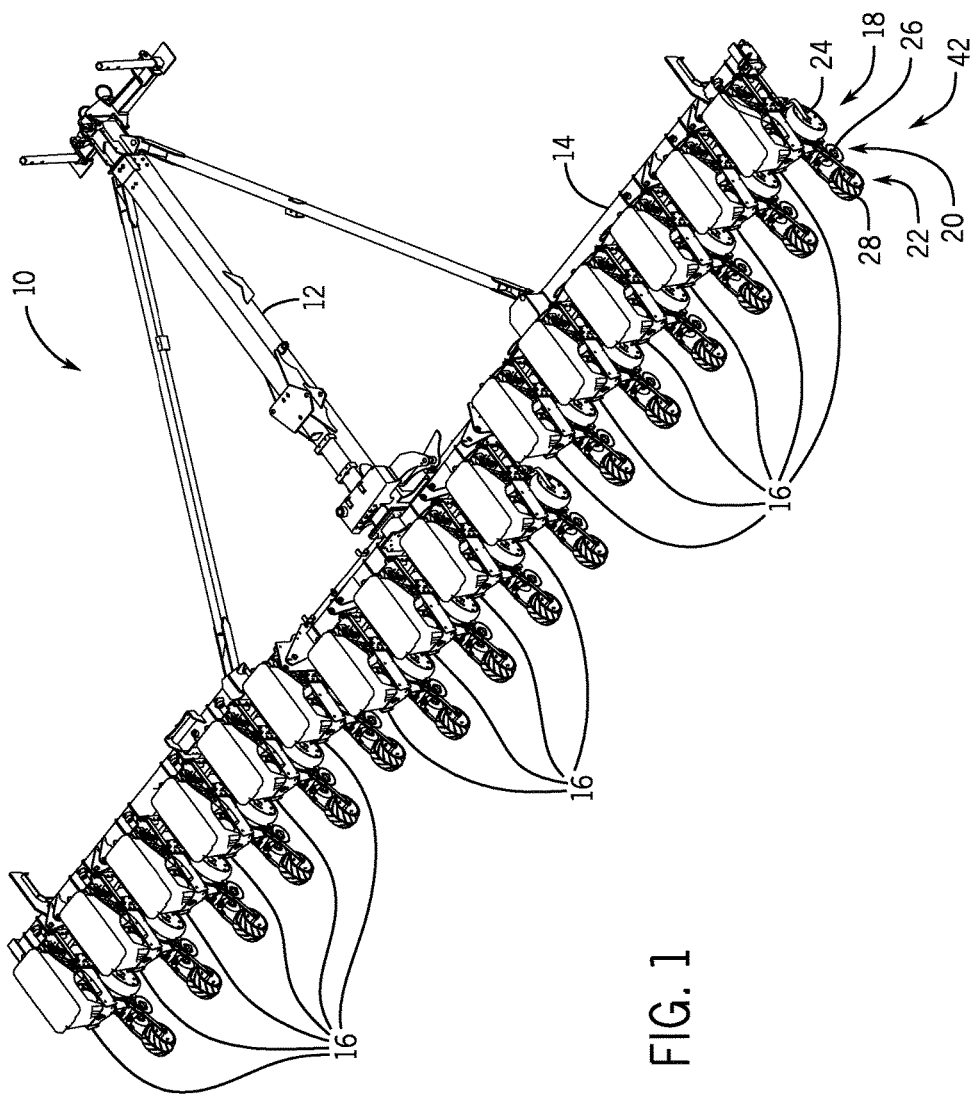
FIG. 1 is a perspective view of an embodiment of an agricultural implement having multiple row units configured to deposit seeds into soil, each row unit having a closing system for moving and packing the soil over the deposited seeds.

Turning now to the drawings, FIG. 1 is a perspective view of an embodiment of an agricultural implement 10 configured to deposit seeds into a soil surface. The agricultural implement 10 is configured to be towed behind a work vehicle, such as a tractor or other prime mover. The agricultural implement 10 includes a tow bar assembly 12 which is arranged in the form of an A-frame hitch assembly. The tow bar assembly 12 may include a hitch to attach the agricultural implement 10 to an appropriate tractor hitch via a ball, clevis, or other coupling. The tow bar assembly 12 is coupled to a tool bar 14, which supports one or more seeding implements or row units 16. As discussed in detail below, each of the row units 16 is configured to deposit seeds at a desired depth beneath the soil surface, thereby establishing rows of planted seeds.

As shown, each of the row units 16 includes an opening assembly 18, a closing assembly 20, and a packer assembly 22. In the present configuration, the opening assembly 18 includes a gauge wheel 24 and an opener disc. The gauge wheel 24 may be positioned a vertical distance above the opener disc to establish a desired trench depth for seed deposition into the soil while the opener disc and the gauge wheel 24 are engaged with the soil. As the row unit travels across a field, the opener disc excavates a trench into the soil for seed deposition. A seed tube, which may be positioned behind the opening assembly, directs seeds from a metering system into the excavated trench. The closing assembly 20 includes a pair of closing discs 26. The closing discs 26 direct the excavated soil into the trench to cover the planted seeds, and a packer wheel 28 of the packer assembly 22 then packs the soil on top of the deposited seeds. Together, the closing assembly 20 and the packing assembly 22 form the closing system 42 that covers and packs the soil over the deposited seeds. The planting process establishes a row of planted seeds within a field. By employing multiple row units 16 distributed along the tool bar 14, as shown in FIG. 1, multiple rows of seeds may be planted within the field.

While the illustrated agricultural implement 10 includes 16 row units 16, it should be appreciated that alternative implements may include more or fewer row units 16. For example, certain agricultural implements 10 may include 4 to 54 row units, or more. In addition, the spacing between row units 16 may be particularly selected based on the type of crop being planted. For example, the row units 16 may be spaced 30 inches from one another for planting corn, and 15 inches from one another for planting soy beans.

As previously mentioned, each of the one or more row units 16 may include the closing assembly 20 having a pair of closing discs 26 that directs the soil over the seeds deposited within the trench created by the opening disc. To block disruptions in the soil (e.g., plant matter, rocks, clay, etc.) from displacing both the closing discs 26 and the packer wheel 28 together, the closing discs 26 and the packer wheel 28 may be separately suspended from the row unit 16, and independently movable relative to one another. With this arrangement, a displacement of the closing discs 26 may not displace the packer wheel 28, and vice versa. As a result, the uniformity of the soil along the trench may be enhanced, thereby resulting in more even plant growth and greater crop yield.

Figure 2:
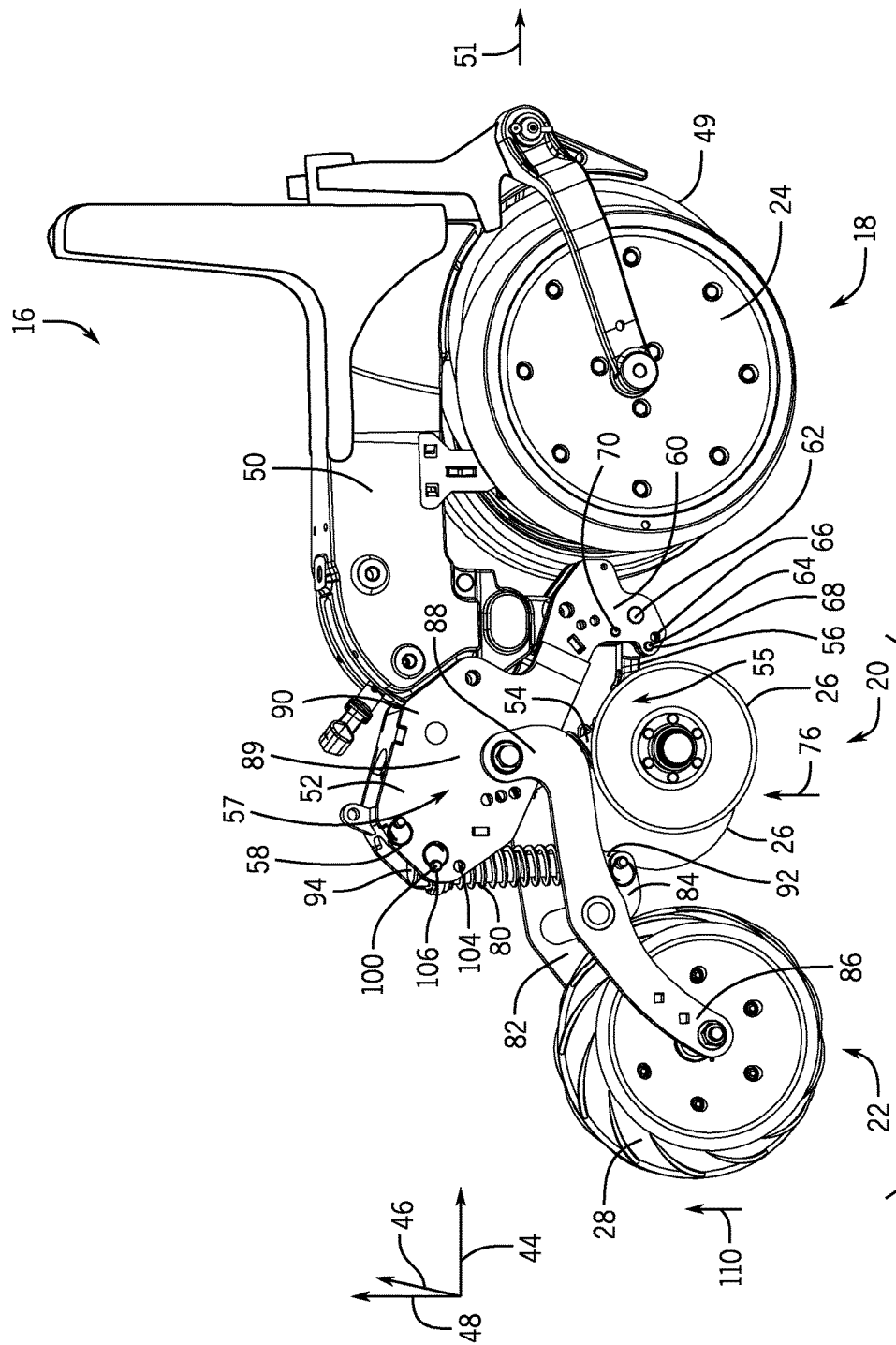
FIG. 2 is a side view of an embodiment of a portion of a row unit having a closing system.

FIG. 2 is a side view of an embodiment of a portion of one row unit 16 having the closing system 42. The row unit 16 may be described with reference to an axial axis or direction 44, a lateral axis or direction 46, and a vertical axis or direction 48. The row unit 16 includes a frame 50 that supports the opener assembly 18, the closing assembly 20, and the packer assembly 22. The frame 50 may also support various other components of the row unit, such as metering systems or the like. An opener disc 49 of the opener assembly 18 is configured to excavate a trench into the soil such that seeds may be deposited (e.g., via a seed tube or other suitable seed deposition device positioned aft of the opener disc 49) within the trench. As noted above, the gauge wheel 24 may be positioned a vertical distance above the opener disc 49 to establish a desired trench depth for seed deposition into the soil.

The closing system 42 includes the closing assembly 20 having the closing discs 26 positioned aft of the seed tube along the axial direction 44 relative to a direction of travel 51 of the row unit 16. In addition, the closing system 42 includes the packer assembly 22 having the packer wheel 28 positioned aft of the closing discs 26 along the axial direction 44 relative the direction of travel 51 of the row unit 16. The closing assembly 20 and the packing assembly 22 are each independently attached to a support structure 52 that is configured to be coupled (e.g., via one or more bolts) to the frame 50 (e.g., backbone) of the row unit 16. As shown, the closing assembly 20 includes the pair of closing discs 26, a first biasing member 54 (e.g., a closing assembly biasing member), and a closing assembly support arm 56. It should be understood that the closing assembly 20 may include any suitable number of closing discs 26, such as 1, 2, 3, 4, or more closing discs 26, for example. As shown, the closing discs 26 are rotatably mounted on opposite lateral sides of the closing assembly support arm 56, as discussed in more detail below. The first biasing member 54 (e.g., a spring cartridge) has a first end 55 coupled to the closing assembly support arm 56 and a second end 57 coupled to an upper region 58 (e.g., a first end) of the support structure 52. The first biasing member 54 urges the closing discs 26 in a generally downward (e.g., along the vertical axis 48) and/or in a generally forward direction (e.g., along the axial axis 44 relative to the direction of travel 51) toward the soil. The closing assembly support arm 56 extends from the pair of closing discs 26 to a lower region 60 (e.g., a second end) of the support structure 52. As shown, the closing assembly support arm 56 is rotatably mounted to the support structure 52 via a hinge 62. The closing assembly support arm 56 generally provides support to the closing discs 26 and blocks movement of the closing discs 26 in the lateral direction 46, while facilitating rotational movement of the closing discs 26 relative to the support structure 52.

A position of the closing assembly support arm 56 relative to the support structure 52, and in turn a preloaded force on the first biasing member 54, can be adjusted via placement of a pin 64 in one of multiple recesses formed in the support structure 52. For example, the pin 64 may be placed within a first recess 66 or within a second recess 68 positioned generally above the first recess 66. When the pin 64 is in the first recess 66, the preloaded force on the first biasing member 52 is relatively low, and the closing assembly support arm 56 may rotate about the hinge 62 between the first recess 66 and a stop 70. Alternatively, when the pin 64 is in the second recess 68, the preloaded force on the first biasing member 52 is relatively high, and the closing assembly support arm 56 may rotate about the hinge 60 between the second recess 66 and the stop 70. Contact between the pin 64 and the closing assembly support arm 56 blocks downward movement of the closing assembly support arm 56, and thus compresses the first biasing member 54. In addition, contact between the stop 70 and the closing assembly support arm 56 blocks upward rotation of the closing assembly support arm 56 and, thus, blocks upward motion of the closing discs 26. In the illustrated configuration, when the closing discs 26 encounter an obstruction in the field, the closing discs 26 may move in a generally upward direction as shown by arrow 76.

The packing assembly 22 includes the packing wheel 28, a second biasing member 80 (e.g., a packing assembly biasing member), a pair of packer wheel support arm 82, and an anchor 84. The packing wheel 28 is rotatably mounted between the packer wheel support arms 82 at respective first ends 86 of the packer wheel support arms 82. Respective second ends 88 of the packer wheel support arms 82 are coupled to a center region 89 of the support structure 52. As shown, the second ends 88 are rotatably coupled to outer surfaces 90 on laterally opposite sides of the support structure 52. The second biasing member 80 has a first end 92 coupled to the anchor 84 and a second end 94 coupled to the upper region 58 of the support structure 52. The anchor 84 is coupled to the first end 92 of the second biasing member 80 and to the packer wheel support arms 82, thus, enabling the second biasing member 80 to urge the packer wheel 28 in a generally downward direction along the vertical axis 48 toward the soil.

A preloaded force on the second biasing member 80 can be adjusted via placement of a packing assembly pin 100 in one of multiple recesses formed in the upper region 58 of the support structure 52. For example, the packing assembly pin 100 may be placed within a first recess 104 or within a second recess 106 positioned generally above the first recess 104. When the packing assembly pin 100 is in the first recess 104, the preloaded force on the second biasing member 80 is relatively high, and when the packing assembly pin 100 is in the second recess 106, the preloaded force on the second biasing member 80 is relatively low. In the illustrated configuration, when the packer wheel 28 encounters an obstruction in the field, the packer wheel 28 may move in a generally upward direction along the vertical axis 48 relative to the support structure 52, as shown by arrow 110. As discussed above, in the disclosed configurations, the closing discs 26 and the packer wheel 28 are separately coupled to the support structure 52, and thus, are independently movable relative to one another.

Figure 3:
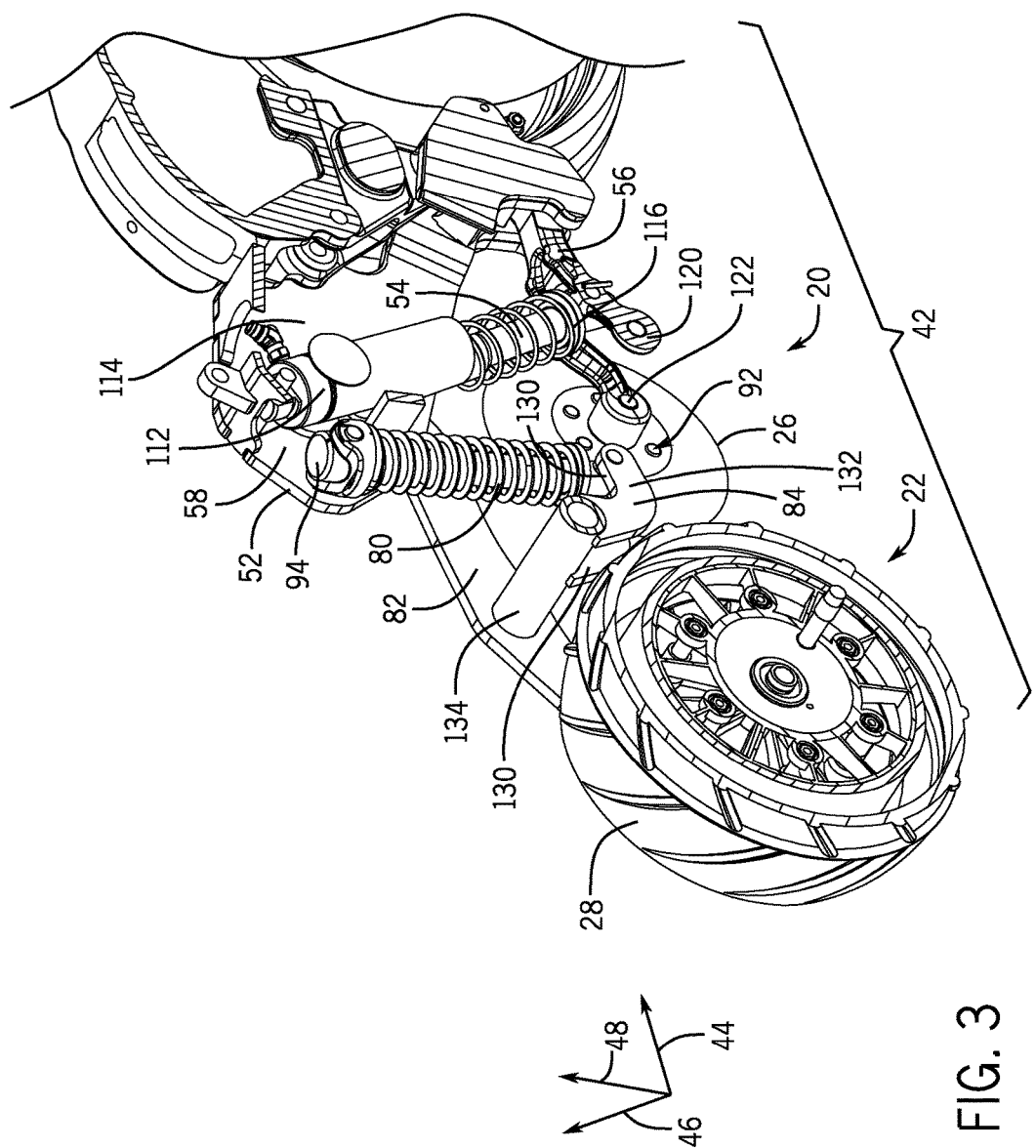
FIG. 3 is a perspective view of the closing system of FIG. 2.

FIG. 3 is a perspective view of an embodiment of a portion of the closing system 42 of FIG. 2. One closing disc 26 and a portion of the support structure 52 are removed to illustrate certain features of the closing system 42. As shown, the closing assembly 20 includes the first biasing member 54 that extends between the closing assembly support arm 56 and the upper region 58 of the support structure 52. A first end 112 of the first biasing member 54 is coupled to inner surfaces 114 of the support structure 52. A second end 116 of the first biasing member 54 is disposed between a first branch 120 and a second branch 122 of the closing assembly support arm 56. The first branch 120 and the second branch 122 are coupled to respective closing discs 26. In the illustrated embodiment, the first branch 120 and the second branch 122 have different lengths so that the closing discs 26 are offset from one another in the axial direction 44.

Additionally, as shown, the packer assembly 22 includes the second biasing member 80 that extends between the anchor 84 and the upper region 58 of the support structure 52. The first end 92 of the second biasing member 80 is disposed between a first arm 130 and a second arm 132 of the anchor 84. The anchor 84 is coupled to the packer wheel support arms 82 via a support bar 134. The second end 94 of the second biasing member 80 is coupled to inner surfaces 114 of the support structure 52. As shown, the closing discs 26 and the packer wheel 28 are separately coupled to the support structure 52, and thus, are independently movable relative to one another.

It should be noted that, while an embodiment of a planting implement is illustrated in FIG. 1, any suitable implement (or other material conveying mechanism) may include the disclosed features. For example, the closing assembly 20 and the packing assembly 22 described herein may be used with an air seeder.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A row unit for an agricultural implement comprising:
a support structure;
a closing disc configured to move soil into a trench, the closing disc rotatably coupled to a first portion of the support structure via a first arm to facilitate vertical movement of the closing disc relative to the support structure, wherein the support structure comprises multiple apertures each configured to receive a pin, the pin is configured to be inserted into one of the multiple apertures and to contact the first arm to block vertical movement of the first arm in a downward direction, and a stop is coupled to the support structure and is configured to contact the first arm to block vertical movement of the first arm in an upward direction;
a packer wheel positioned aft of the closing disc and configured to pack soil over the trench, the packer wheel rotatably coupled to a second portion of the support structure via a second arm, wherein the closing disc and the packer wheel are independently movable relative to one another; and
a first biasing member extending between the closing disc and the support structure and a second biasing member extending between the packer wheel and the support structure, wherein the first biasing member is coupled to the support structure at a first mounting point, the second biasing member is coupled to the support structure at a second mounting point, and the first mounting point and the second mounting point are positioned rearward of an attachment point between the second arm and the support structure relative to a direction of travel of the agricultural implement.

2. The row unit of claim 1, comprising a pair of closing discs, wherein the first arm comprises a first branch coupled to a first closing disc of the pair of closing discs and a second branch coupled to a second closing disc of the pair of closing discs.

3. The row unit of claim 2, wherein the first closing disc and the second closing disc are axially offset relative to one another.

4. The row unit of claim 1, comprising a first biasing member configured to urge the closing disc toward the soil as the agricultural implement travels across a field.

5. The row unit of claim 4, wherein the first biasing member extends from a third portion of the support structure to the first arm.

6. The row unit of claim 4, wherein the multiple apertures are vertically spaced apart and a force of the first biasing member is adjustable via insertion of the pin into one of the multiple apertures.

7. The row unit of claim 4, comprising a second biasing member configured to urge the packer wheel toward the soil as the agricultural implement travels across the field.

8. The row unit of claim 7, wherein the second biasing member extends from a third portion of the support structure to an anchor coupled to the second arm.

9. The row unit of claim 8, wherein the anchor comprises two parallel arms extending from a support bar.

10. A row unit for an agricultural implement comprising:
a support structure;
a closing disc suspended from the support structure at least in part by a first biasing member that is coupled to the support structure at a first mounting point, wherein the closing disc is rotatably supported by a first arm that is pivotally coupled to the support structure by a first pivot, the closing disc is configured to be positioned aft of an opener disc and to move soil into a trench formed by the opener disc as the agricultural implement travels across a field in a direction of travel; and
a packer wheel suspended from the support structure at least in part by a second biasing member that is coupled to the support structure at a second mounting point, wherein the packer wheel is rotatably supported by a second arm that is pivotally coupled to the support structure by a second pivot, the packer wheel is positioned aft of the closing disc, the packer wheel is configured to pack soil over the trench as the agricultural implement travels across the field, the closing disc and the packer wheel are separately suspended from the support structure to enable the closing disc and the packer wheel to move independently from one another in a vertical direction relative to the support structure, the first pivot is coupled to the support structure at a position that is vertically below the second pivot, and the first mounting point and the second mounting point are positioned rearward of the second pivot relative to the direction of travel.

11. The row unit of claim 10, wherein the first biasing member extends between the first arm and the support structure.

12. The row unit of claim 10, wherein the second biasing member extends between an anchor coupled to the second arm and the support structure.

13. A row unit for an agricultural implement comprising:
a support structure configured to be coupled to a frame of the row unit;
a closing assembly, comprising:
a closing disc configured to move soil into a trench, wherein the closing disc is coupled to the support structure via a first arm pivotally coupled to a lower region of the support structure and via a first biasing member coupled to the support structure at a first mounting point, wherein the support structure comprises multiple apertures each configured to receive a pin, and the pin is configured to be inserted into one of the multiple apertures and to contact the first arm to block vertical movement of the first arm; and
a packing assembly, comprising:
a packer wheel configured to pack the soil over the trench, wherein the packer wheel is coupled to the support structure via a second arm pivotally coupled, via a pivot, to a central region of the support structure that is vertically above the lower region and via a second biasing member coupled to the support structure at a second mounting point, the closing disc and the packer wheel are independently movable relative to one another in a vertical direction relative to the support structure, and the first mounting point and the second mounting point are positioned rearward of the pivot relative to a direction of travel of the agricultural implement.

14. The row unit of claim 13, wherein the first mounting point and the second mounting point are vertically above the central region.

15. The row unit of claim 13, comprising a pair of closing discs, wherein the first arm comprises a first branch coupled to a first closing disc of the pair of closing discs and a second branch coupled to a second closing disc of the pair of closing discs.

16. The row unit of claim 13, wherein the first biasing member is coupled to the first arm.

17. The row unit of claim 13, wherein the second biasing member is coupled to the upper region of the support structure and to an anchor extending from the second arm.

18. The row unit of claim 1, wherein the first arm is coupled to the first portion of the support structure via a first pivot, the second arm is coupled to the second portion of the support structure via a second pivot, and the first pivot is positioned below the second pivot.

19. The row unit of claim 10, wherein the support structure comprises multiple apertures each configured to receive a pin, and the pin is configured to be inserted into one of the multiple apertures to contact the first arm to block movement of the first arm in the vertical direction and to adjust a force of the first biasing member.

* * * * *